(12) United States Patent
Mahdi

(10) Patent No.: US 7,979,558 B2
(45) Date of Patent: Jul. 12, 2011

(54) REMOTE SESSION CONTROL

(75) Inventor: Kaniz Mahdi, Carrollton, TX (US)

(73) Assignee: FutureWei Technologies, Inc., Plano, TX (US)

( * ) Notice: Subject to any disclaimer, the term of this patent is extended or adjusted under 35 U.S.C. 154(b) by 103 days.

(21) Appl. No.: 12/483,981

(22) Filed: Jun. 12, 2009

(65) Prior Publication Data

US 2010/0036958 A1 Feb. 11, 2010

Related U.S. Application Data

(60) Provisional application No. 61/086,504, filed on Aug. 6, 2008, provisional application No. 61/100,111, filed on Sep. 25, 2008, provisional application No. 61/099,827, filed on Sep. 24, 2008.

(51) Int. Cl.
G06F 15/16 (2006.01)
G06F 12/00 (2006.01)

(52) U.S. Cl. ................................... 709/227

(58) Field of Classification Search ............... 709/203, 709/217–218, 227–229, 250
See application file for complete search history.

(56) References Cited

U.S. PATENT DOCUMENTS

| | | | | |
|---|---|---|---|---|
| 5,165,020 | A * | 11/1992 | Sudama et al. | 709/227 |
| 7,082,092 | B2 * | 7/2006 | Weijenbergh et al. | 369/59.25 |
| 7,564,866 | B2 * | 7/2009 | Agazzi et al. | 370/463 |
| 2002/0145632 | A1 * | 10/2002 | Shmueli et al. | 345/835 |
| 2007/0192494 | A1 * | 8/2007 | Yamakawa et al. | 709/227 |
| 2007/0198463 | A1 * | 8/2007 | Sarakas | 707/1 |
| 2009/0207807 | A1 * | 8/2009 | Mahdi et al. | 370/331 |
| 2009/0313378 | A1 * | 12/2009 | Mahdi et al. | 709/227 |
| 2010/0157882 | A1 * | 6/2010 | Moriwaki et al. | 370/328 |
| 2010/0195644 | A1 * | 8/2010 | Hao | 370/352 |

OTHER PUBLICATIONS

3$^{rd}$ Generation Partnership Project, Technical Specification Group Services and Architecture, "IP Multimedia System (IMS) Service Continuity," Stage 2, Release 9, 3GPP TS 23.237 V9.1.0, Jun. 2009, pp. 1-88.
3$^{rd}$ Generation Partnership Project, Technical Specification Group Services and System Aspects, "IP Multimedia Subsystem (IMS) centralized services," Stage 2, Release 9, 3 GPP TS 23.292 V9.2.0, Jun. 2009, pp. 1-105.
3$^{rd}$ Generation Partnership Project, Technical Specification Group Services and System Aspects, "IP Multimedia Subsystem (IMS) service continuity enhancements; Service, policy and interaction," Stage 2, Release 9, 3GPP TR 23.838 V9.0.0, Jun. 2009, pp. 1-51.
3$^{rd}$ Generation Partnership Project, Technical Specification Group Core Network and Terminals, "IP Multimedia (IM) Core Network (CN) subsystem IP Multimedia Subsystem (IMS) Service Continuity," Stage 3, Release 8, 3GPP TS 274.237 V8.2.0, Jun. 2009, pp. 1-71.
3$^{rd}$ Generation Partnership Project, Technical Specification Group Core Network and Terminals, "IP Multimedia (IM) Core Network (CN) subsystem Centralized Services (ICS)," Stage 3, Release 9, 3GPP TS 24.292 V9.0.0, Jun. 2009, pp. 1-164.

* cited by examiner

*Primary Examiner* — Zarni Maung
(74) *Attorney, Agent, or Firm* — Slater & Matsil, L.L.P.

(57) ABSTRACT

A method and system for remote session control of IP Multimedia Subsystem (IMS) sessions, wherein media is established using one or more devices, and multi-media session/session control for multi-media session is provided by a device which may or may not be the same as the device on which the media is established. A method and system is also provided to transfer media from one device to one or more devices retaining multi-media session/session control on a transferring device.

9 Claims, 11 Drawing Sheets

REMOTE SESSION CONTROL

This application claims the benefit of U.S. Provisional Application No. 61/099,827, filed on Sep. 24, 2008, entitled "A Method for Setting up Sessions with Media on the Device Controlling the Session and/or a Different Device," U.S. Provisional Application No. 61/100,111, filed on Sep. 25, 2008, entitled "A Method for Setting up Sessions with Media on the Device Controlling the Session and/or a Different Device," and U.S. Provisional Application No. 61/086,504, filed on Aug. 6, 2008, entitled "Remote Session control," which applications are hereby incorporated herein by reference.

CROSS-REFERENCE TO RELATED APPLICATIONS

This application relates to the following co-pending and commonly assigned patent application Ser. No. 12/484,928, filed Jun. 15, 2009, entitled "Remote Media IMS Sessions."

TECHNICAL FIELD

The present invention relates generally to telecommunications and, more particularly, to a system and method for remote session control of IP Multimedia Subsystem (IMS) sessions.

BACKGROUND

As mobile devices improve and include more enhanced capabilities, mobile devices have evolved to act as Internet Protocol (IP) devices. One such system, e.g., a system employing IP Multimedia services (IMS) sessions, is illustrated in FIG. 1, wherein a traditional signaling or bearer architecture for a local media session is illustrated. The traditional IMS session is created between a User Equipment (UE) 102 and a remote end 104, thereby enabling the UE 102 to access media flows, such as media flow 106. The standard IMS signaling flow, illustrated in FIG. 1 by the dotted line 108, extends between a Call Session Control Function (CSCF) 110, a Service Centralization Continuity Application Server (SCC AS) 112, and a Telephony Application Server (TAS) 114 (and/or other application servers).

Generally, the CSCF 110 processes session initiation protocol (SIP) signaling packets in the IMS system, and the application servers host and execute a variety of services. In one embodiment, the SCC AS 112 operates in a Back-to-Back User Agent (B2BUA) mode wherein it acts as an SIP element to mediate SIP signaling between the UE 102 and the remote end 104. In the embodiment illustrated in FIG. 1, the SCC AS 112 establishes an access leg using IMS procedures between the SCC AS 112 and the CSCF 110 on the UE 102 side and establishes a remote leg using IMS procedures to the CSCF 110 on the remote end 104 side. Other application servers, such as the TAS 114 illustrated in FIG. 1, may be executed on the remote leg as part of standard service execution logic at the CSCF 110.

The result of an IMS session established as discussed above is a media flow 106 and a session control signaling flow 108 established between the UE 102 and the remote end 104. Unfortunately, however, the media flow 106 and the session control signaling flow 108 are tied to the same device, thereby not allowing the media flow 106 to be sent to a different device or controlled by a different device. For example, if a user is interested in watching a video, current implementations require that the media flow 106, e.g., the video, be sent to the same device, e.g., a wireless telephone, as is controlling the video. Moreover, when a media flow 106 is transferred to another device, both the session control signaling flow 108 and the media flow 106 are transferred to the same device. This situation is not always convenient or desired by the user, who may want to control the media flow 106 via one device, but watch the video on a different device, such as a computer monitor or television.

Furthermore, some IP devices are stationary, such as hardware IP phones, video-conferencing units, embedded devices, and the like. While these IP devices may be stationary, these IP devices may allow more convenience of use and additional capabilities than other more mobile IP devices, but maintain session control on the mobile IP device. As a result, it may be desirable to separate the media flow from the session control signaling flow.

Thus, there is a need for a method and system that allows the media flow to be controlled by a separate device, thereby allowing the moving of active multimedia sessions between IP devices to allow mobile and stationary devices to be used concurrently or interchangeably in mid-session, combining their advantages into a single "virtual device."

SUMMARY OF THE INVENTION

These and other problems are generally solved or circumvented, and technical advantages are generally achieved, by preferred embodiments of the present invention which provides for remote session control for IMS sessions.

Generally, embodiments of the present invention provide a system, comprising various methods and apparatuses, for remote session control of IP Multimedia Subsystem (IMS) sessions, wherein media is established using one or more devices, and multi-media session/session control for a multi-media session is provided by a device which may or may not be the same as the device on which media is established.

Embodiments of the present invention provide a system and method that allows a media flow to be transferred from a first device to a second device, while session control remains on the first device. This allows the session control to be separated from the media flow. The media flow may be retrieved or transferred to yet another device within a single communications session. The remote media flow may be added as part of a new session or added to an existing session. A single session with multiple media flows may also be configured such that the different media flows are directed to different devices, wherein the session control signaling is directed to one of those devices or yet another device.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
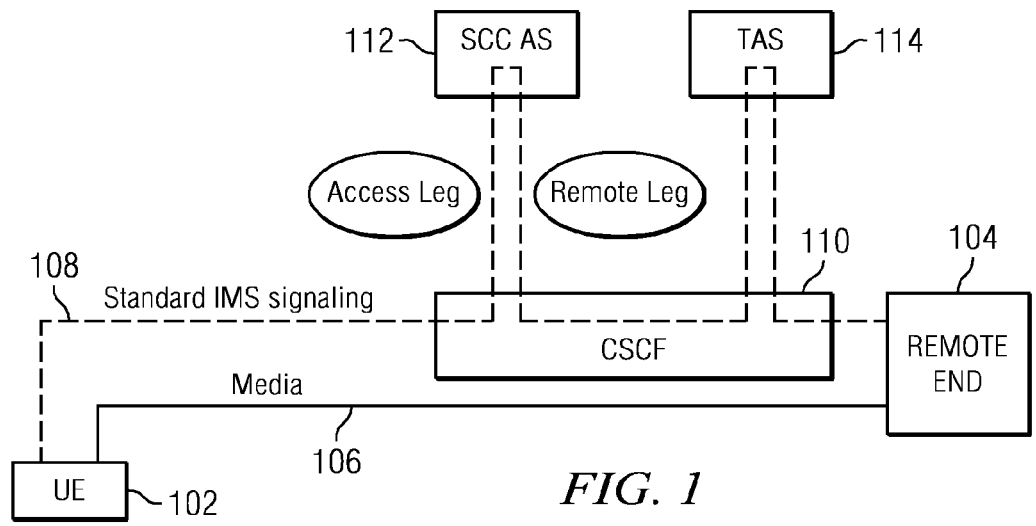
FIG. 1 depicts a signaling or bearer architecture for a prior art system.

IMS sessions such as those described above with reference to FIG. 1 in which the session control signaling flow and the media flow (and the media control flow) are all transferred to a transferee device are referred to herein as a Release Control Mode (RCM). In contrast, embodiments of the present invention allow a transfer of an IMS session in which the session control signaling and the media control/media flow are separated such that the session control signaling is maintained by one UE, and the media and media control is maintained by a different UE. This mode in which session control is separated from the media flow/control is referred to herein as a Keep Control Mode (KCM). A session controlled by a UE that is the same as the UE controlling a media flow is referred to herein as a local media session, and a session controlled by a UE which is different from a UE controlling a media flow is referred to herein as a remote media session.

As one of ordinary skill in the art will realize, embodiments of the present invention provide a singular virtual session comprising of session control and media provided by two or more devices with the linkage and association amongst the remote media and associated session control provided through IMS SIP signaling.

Figure 2:
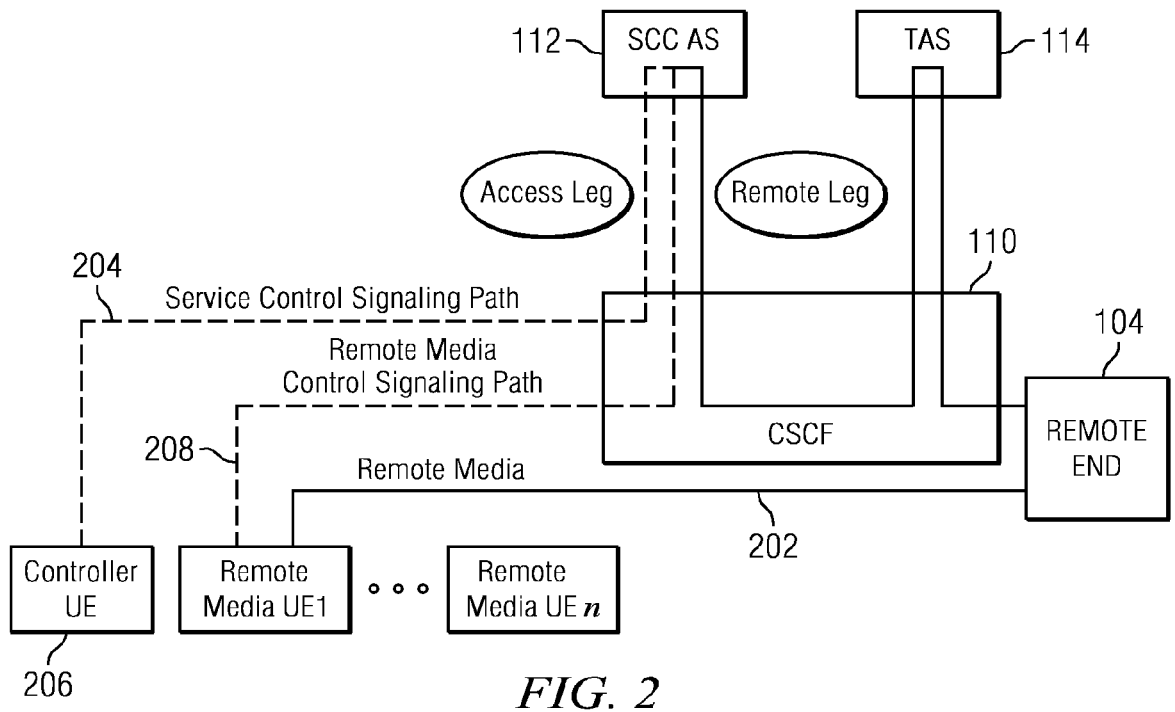
FIG. 2 depicts a signaling or bearer architecture for a remote media session according to one embodiment of the present invention.

Referring now to FIG. 2, a signaling and bearer architecture for a remote media session is illustrated in accordance with an embodiment of the present invention. In this embodiment, a remote media flow 202, such as a voice and/or video, is established to one or more remote media UE1-UEn, while session control is established with a controller UE 206 via a session control signaling path 204. A remote media control signaling path 208, which provides the necessary signaling for the transmission of the remote media flow 202, is also established with the remote media UE1-UEn. A remote media session may be established, or a local media session may be modified to a remote media session, by using IMS session setup/modification procedures as described herein.

As illustrated in FIG. 2, the SCC AS 112 combines the session control signaling flow communicated over the session control signaling path 204 with the media control signaling communicated over the remote media control signaling path 208. The SCC AS 112 may employ, for example, 3pcc techniques for enabling inter-UE transfers (both KCM and RCM) and maintaining end-to-end session service state across multiple, consecutive RCM and KCM transfers, which may be executed in any order, or any number of times, for a given session. Furthermore, the controller UE 206 may maintain session control for a session until the session is released or transferred to another UE using a RCM transfer, and may control the session from session start up or acquire control as a result of a RCM transfer.

While keeping the session control, the controller UE 206 may transfer one or more media flows to one or more remote media UE1-UEn and subsequently retrieve the media flow as requested by a user, thereby transitioning from a local media session to a remote media session and back. The media flow may be transferred between the controller UE 206 and the remote media UE1-UEn using IMS procedures by the transferee's (e.g., the remote media UE1-UEn's) network as discussed below. The control plane in the transferee's network may be used only for media control, while the session control signaling from the transferee's access may be blocked, ignored, or arbitrated with the session control signaling from the controller UE 206, giving precedence to the controller UE 206's stimulus as determined by service requirements.

For B2BUA at the SCC AS 112 in FIG. 2, an access leg may be formed with a combination of the session control signaling path 204 and the remote media control signaling path 208 for representation of a remote media component. A remote leg is presented by the SCC AS 112 to the CSCF 110 as an IMS session. The TAS 114 (and/or other application servers) may be executed on the remote leg as part of standard service execution logic at the CSCF 110.

It should be noted that other network elements, such as routers, gateways, switches, and/or the like, may be present within the network. The configurations and the communications between network elements is provided for illustrative purposes only, and as such, the communications between the specified elements may be between different elements and/or through additional elements as well as different signaling/commands may be used.

As discussed in greater detail in the following paragraphs, the general principles of the present invention may be applied to various scenarios. It should be noted that the following embodiments are provided for illustrative purposes only and are not intended to limit the scope of the present invention to only those embodiments described herein. Furthermore, it should be noted that the messages and the message parameters are provided for illustrative purposes only and that other messages and parameters may be used, as well as any suitable protocol, such as session description protocol (SDP), session initiation protocol (SIP), or the like. Additional information regarding the messages and the parameters may be found in 3GPP TR 23.838, v9.0.0 and 3GPP TS 23.237, v9.1.0, which are incorporated herein by reference.

Figure 3:
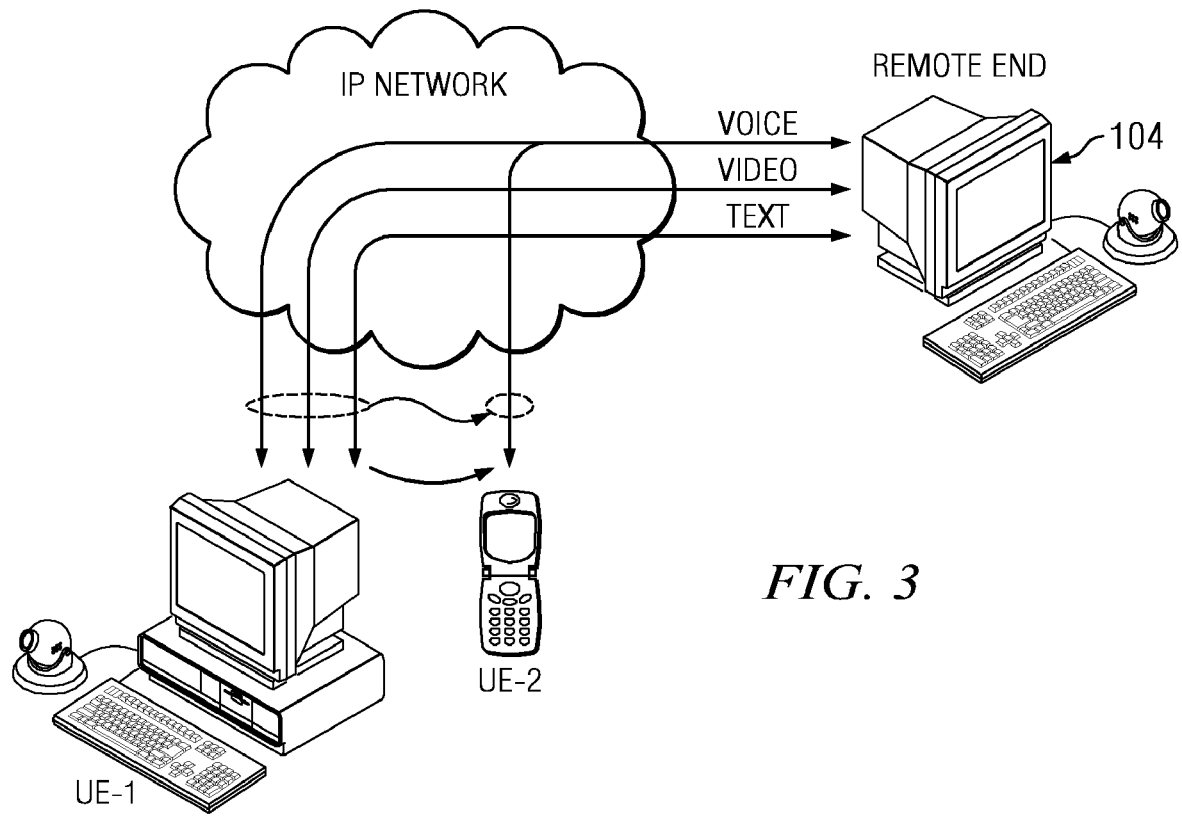
FIG. 3 depicts a transfer of a media flow from one device to another device in accordance with an embodiment of the present invention.
Figure 4:
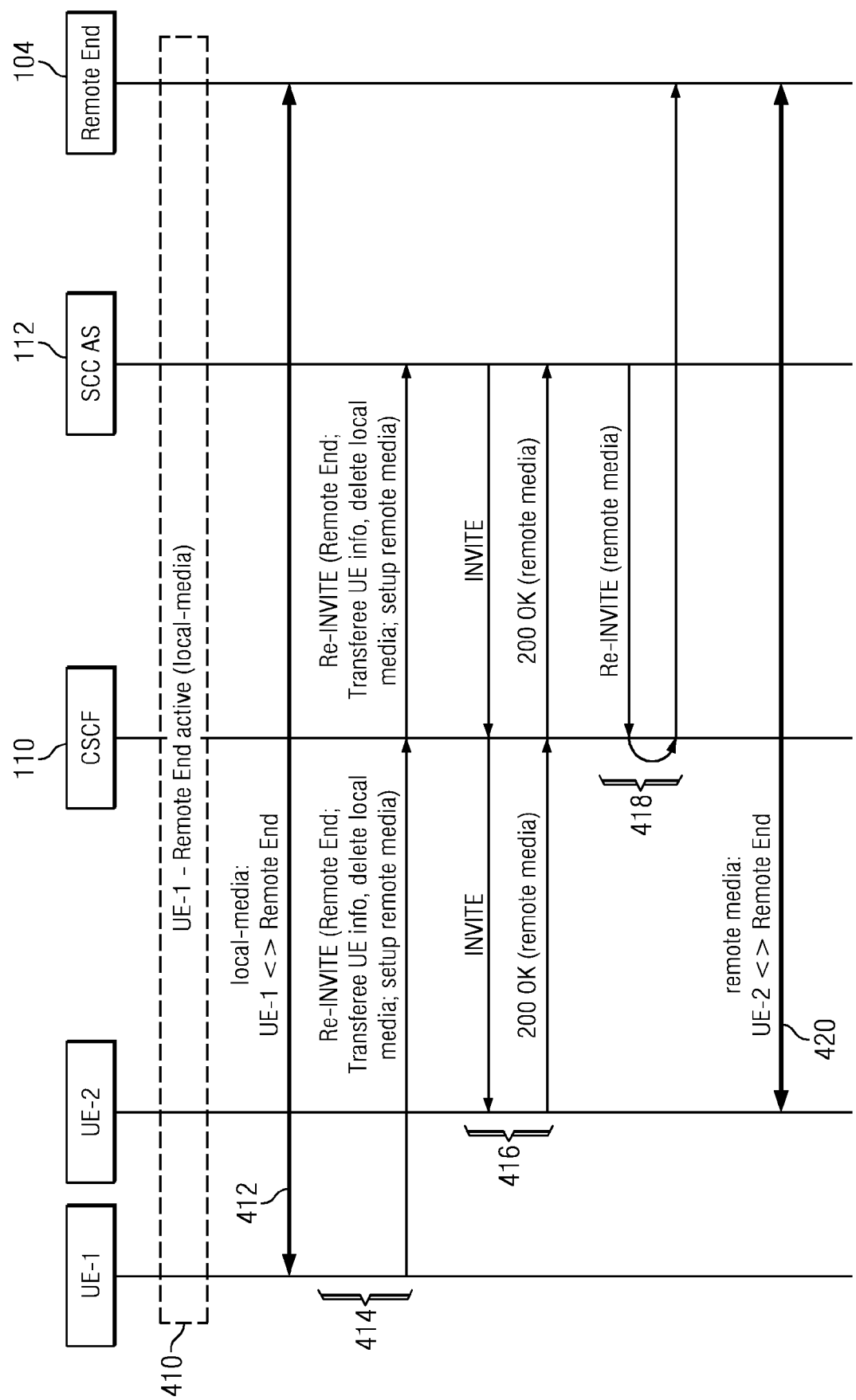
FIG. 4 is a message flow diagram for a transfer of a media flow from one device to another in accordance with an embodiment of the present invention.

Referring first to FIGS. 3 and 4, there is illustrated a situation depicting the transfer of a media flow from UE-1 to UE-2 and a message flow that may be used to effect the transfer of the media flow from UE-1 to UE-2, respectively, in accordance with an embodiment of the present invention. In this embodiment, an IMS session has previously been established between UE-1 and the remote end 104. The IMS session may be established with UE-1 as an origination session (a session originating with UE-1 and terminating with the remote end 104, such as an outgoing call) or as a terminating session (a session originating with the remote end 104 and terminating with UE-1, such as an incoming call). The remote end 104 may represent any media source, including a called party, a content provider, or the like.

Once the session between UE-1 and the remote end 104 is established, UE-1 may initiate a transfer of the media flow from UE-1 to UE-2. An example of this situation is if a user has initiated a call on UE-1, such as a personal computer, but wishes to transfer a media flow, such as the voice portion, to UE-2, such as wireless mobile unit. One or more media flows may remain with UE-1.

FIG. 4 illustrates a message flow for affecting the transfer such as that discussed above with reference to FIG. 3 in accordance with an embodiment of the present invention. As illustrated at step 410, the process begins with a local media session already established between UE-1 and the remote end 104 such that a local media flow (indicated at step 412) exists therebetween. The UE-1 initiates a transfer of the media flow from UE-1 to UE-2 in step 414 by transmitting a SIP Re-INVITE message or another SIP message (e.g., an SIP UPDATE message) over the session control signaling path 204 to the CSCF 110. The Re-INVITE message is directed to the SCC AS 112 and provides the transferee device information, e.g., UE-2 information. Additionally, the Re-INVITE message provides directions regarding how to handle the media flows, which in this case involves deleting the local media (removing the media on the current device) and establishing a remote media flow to the transferee device.

The CSCF 110 forwards the Re-INVITE message to the SCC AS 112, which in turn transmits a SIP INVITE or another SIP message (e.g., a SIP REFER message) to the transferee device, e.g., UE-2, via the CSCF 110 as illustrated at step 416. After the transferee device responds with a message (e.g., SIP 200 OK) that provides media characteristics and other information (e.g., in the SDP), thereby acknowledging and accepting the transferred media flow, the SCC AS 112 instructs the remote end 104 to redirect the media flow to UE-2 as indicated in step 418. As a result, in step 420 a remote media flow is established between UE-2 and the remote end 104. It should be noted that in this embodiment, the media control signaling path 208 extends between UE-2 and the remote end 104, but the session control signaling path 204, and hence the session control, remains with UE-1. In this manner, UE-1 may continue to be used to control the session.

Figure 5:
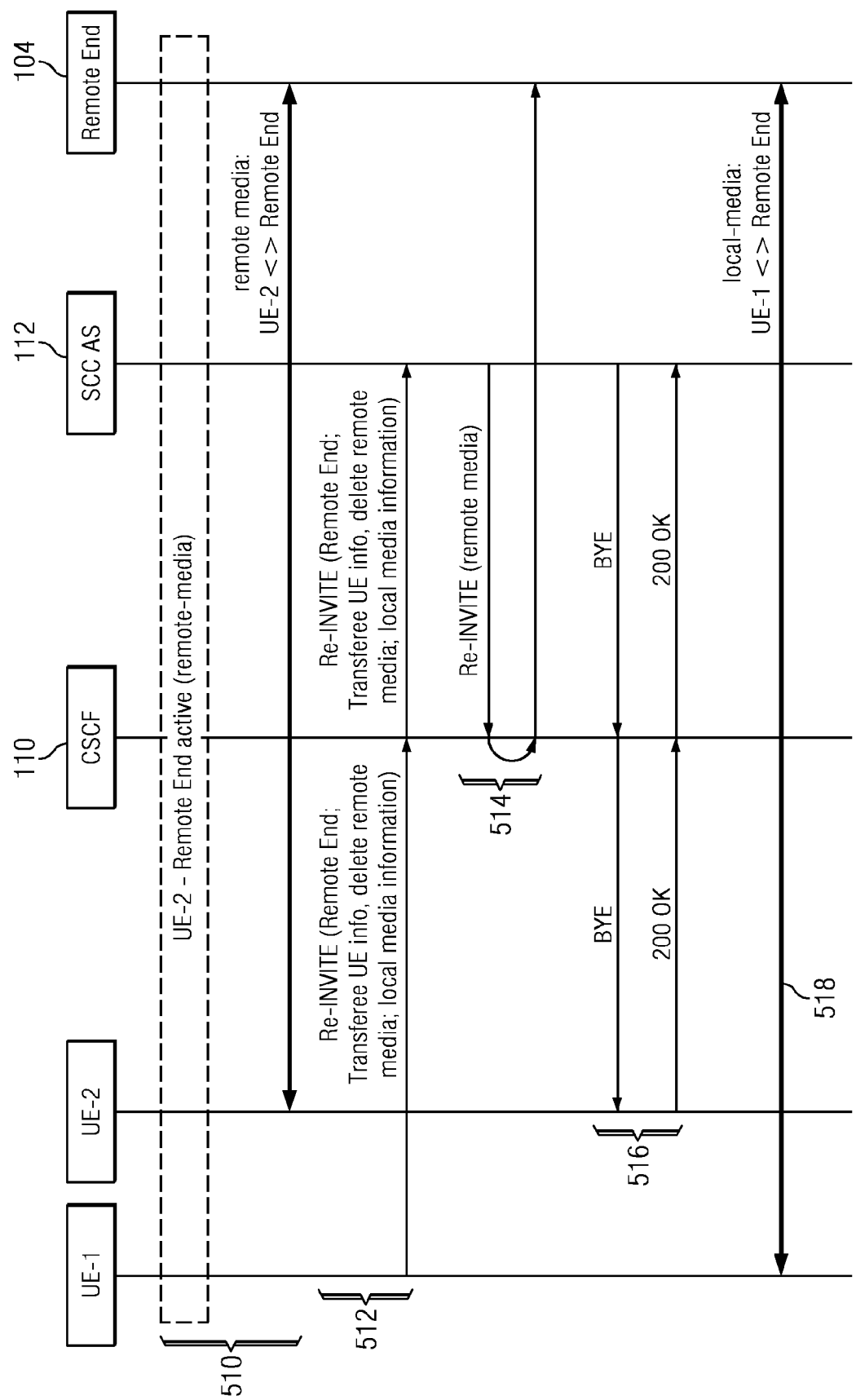
FIG. 5 is a message flow diagram for a retrieval of a media flow in accordance with an embodiment of the present invention.

FIG. 5 illustrates a message flow that may be utilized to enable UE-1 to retrieve the media flow from another device, e.g., UE-2, in accordance with an embodiment of the present invention. One possible scenario in which this procedure may be useful is after transferring a media flow from UE-1 to UE-2 as discussed above with reference to FIGS. 3 and 4, the user wishes to retrieve or redirect the transferred media from UE-2 back to UE-1. As illustrated in FIG. 5, the procedure starts at step 510, wherein a remote media session is established such that UE-1 is acting as the controller UE and a remote media flow is established between UE-2 and the remote end 104, such as another party, content provider, or the like.

In step 512, UE-1 initiates the retrieve process by transmitting a SIP Re-INVITE or another SIP message to the SCC AS 112 via the CSCF. The Re-INVITE message is similar to the Re-INVITE message discussed above with reference to FIG. 4, except that in this case the parameters indicate that the remote media flow is to be deleted and provide local media information (e.g., UE-1 information). In step 514, the SCC AS 112 issues a SIP Re-INVITE message to the remote end 104 via the CSCF 110, providing the local media information, and in step 516, the SCC AS 112 issues a BYE message to UE-2 via the CSCF 110, thereby instructing UE-2 to terminate the remote media flow. As a result of this process, the remote media session is converted to a local media session as indicated by step 518.

Figure 6:
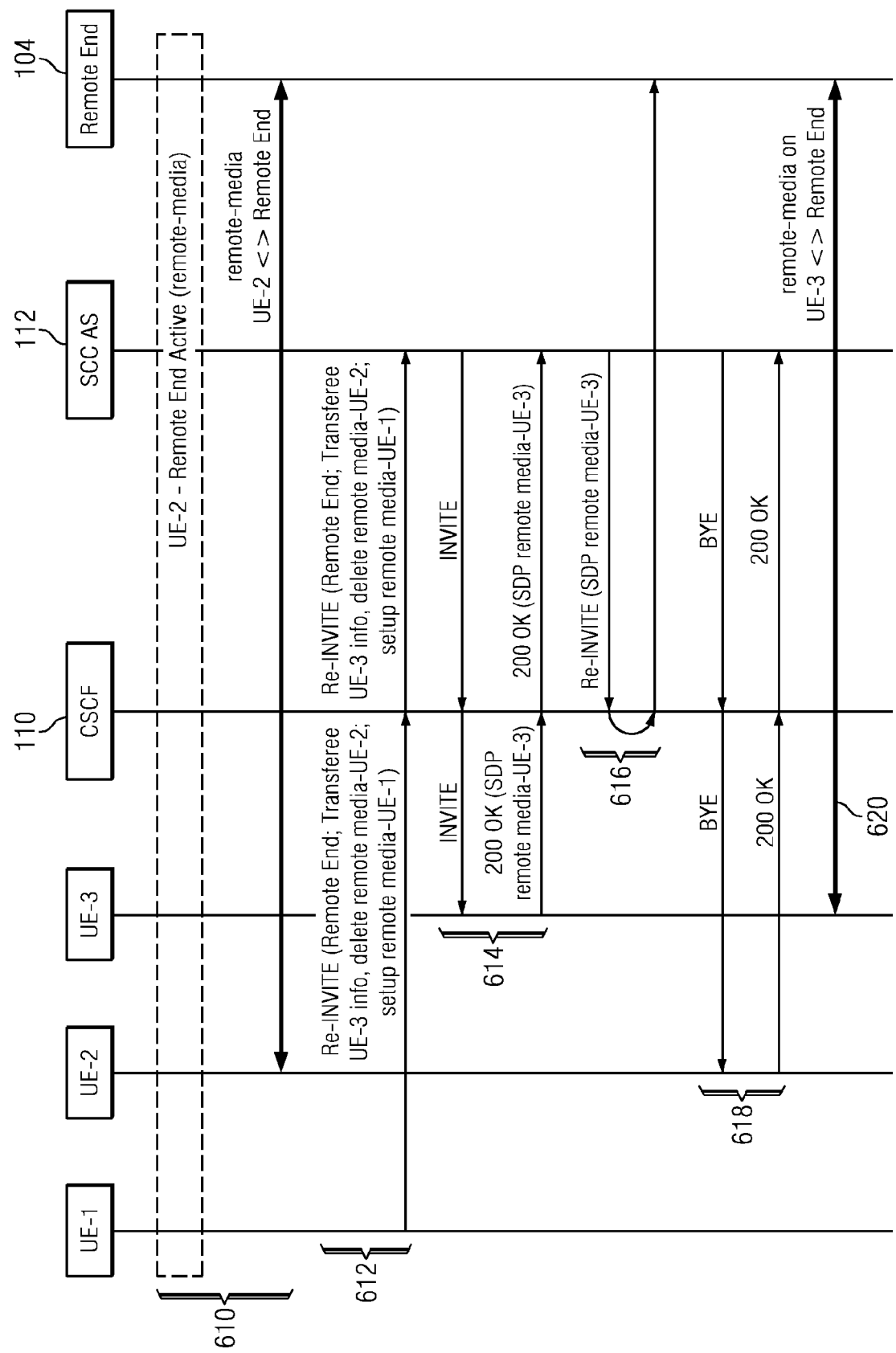
FIG. 6 is a message flow diagram for a transfer of a media flow from one remote device to another remote device in accordance with an embodiment of the present invention.

FIG. 6 illustrates a message flow in which a remote media flow is transferred from one UE, e.g., UE-2, to another UE, e.g., UE-3, in accordance with an embodiment of the present invention. In this embodiment, the session control signaling path 204 remains with the original UE, e.g., UE-1, such that UE-1 remains the controller UE.

The process begins in step 610, which illustrates that a remote media session has been established such that UE-1 acts as the controller UE and UE-2 acts as the remote media UE. In step 612, the controller issues a SIP Re-INVITE to the SCC AS 112 via the CSCF 110. The Re-INVITE message is similar to the Re-INVITE message discussed above, except that the parameters includes UE information related to the UE to which the media is to be transferred, e.g., UE-3 in this case. The parameters also include an instruction to delete or stop the remote media flow to UE-2 and an instruction to establish a remote media flow on UE-3.

In step 614, the SCC AS 112 performs a SIP INVITE transaction with UE-3 consisting of an INVITE message transmitted from the SCC AS 112 to UE-3 via the CSCF 110 and an OK message transmitted from UE-3 to the SCC AS 112 via the CSCF 110. In step 616, the SCC AS 112 issues a SIP Re-INVITE message to the remote end 104 to provide the UE information for the new UE, e.g., UE-3, and in step 618, the SCC AS 112 issues a BYE message to the UE from which the media flow is being transferred, e.g., UE-2. Thereafter, the media flow is established from the remote end 104 to UE-3, as indicated in step 620.

Figure 7:
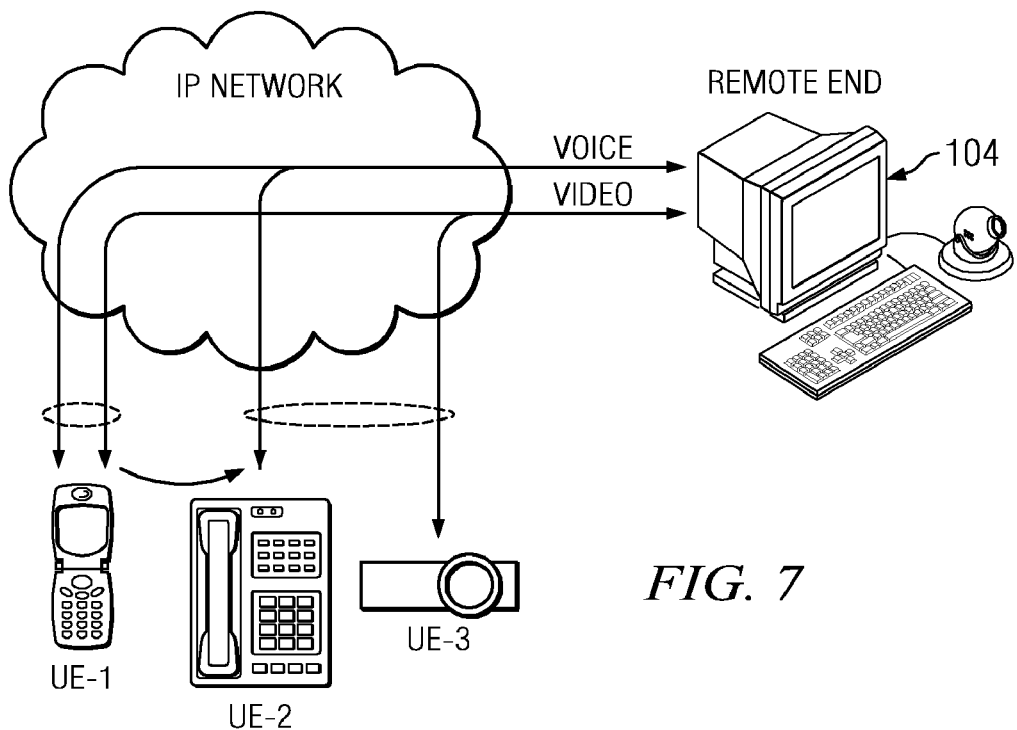
FIG. 7 depicts a transfer of one media flow from a controller device to a first remote device and a transfer of another media flow from the controller device to a second remote device in accordance with an embodiment of the present invention.
Figure 8:
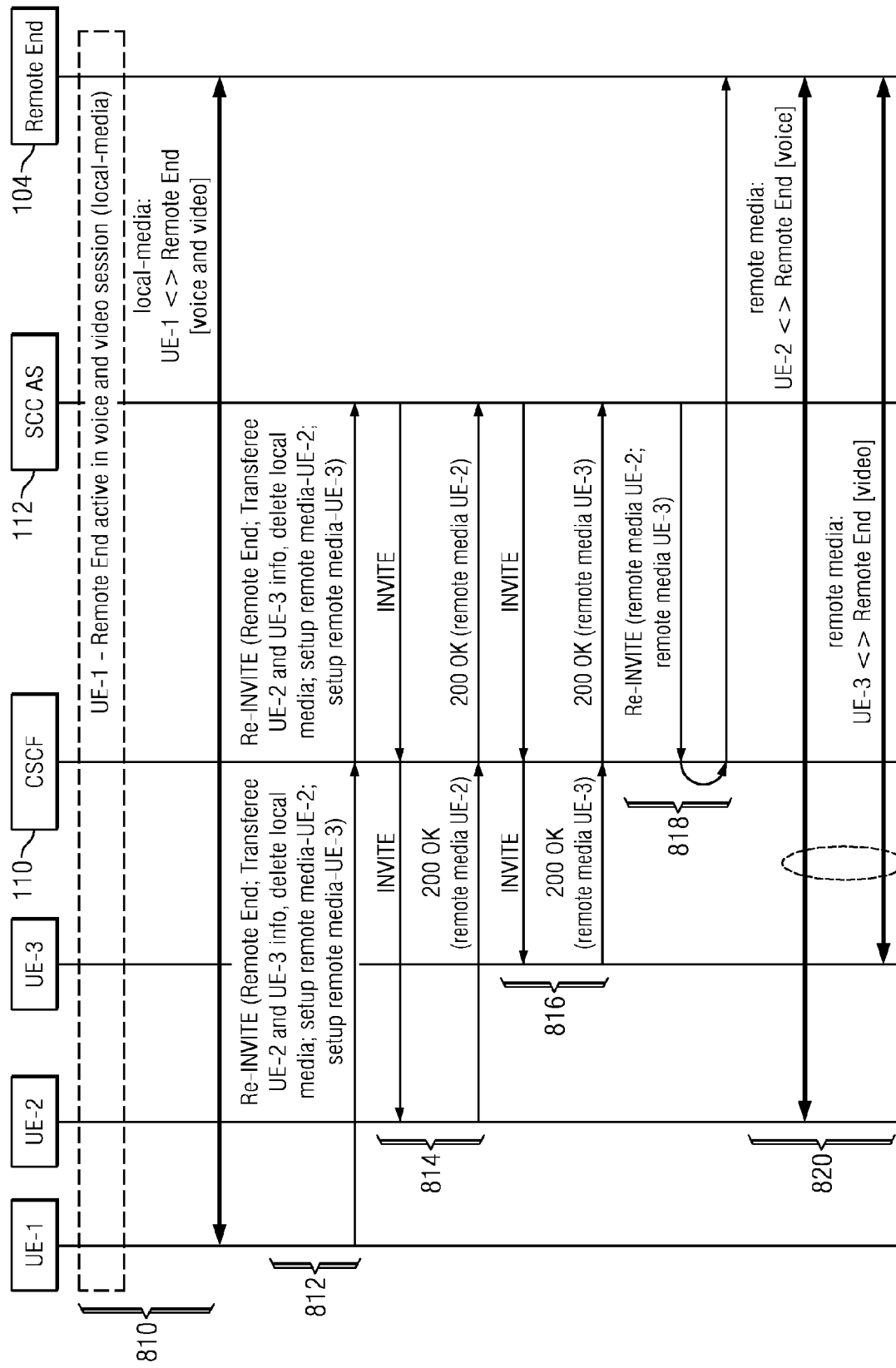
FIG. 8 is a message flow diagram for a transfer of one media flow from a controller device to a first remote device and a transfer of another media flow from the controller device to a second remote device in accordance with an embodiment of the present invention.

FIGS. 7 and 8 illustrate a situation in which one media flow is transferred to one UE and another media flow is transferred to another UE in accordance with an embodiment of the present invention. In the example illustrated in FIGS. 7 and 8, voice and video media flows are initially established between the remote end 104 and UE-1, which is acting as the controller UE and the media UE. The voice media flow is then transferred to UE-2, such as a speaker phone, and the video media flow is transferred to UE-3, such as a projector. In this situation, the session control signaling path 204 remains with UE-1.

Referring now to FIG. 8, a message flow that may be utilized to transfer the media as illustrated in FIG. 7 is shown. The process begins in step 810, which illustrates that a local media flow has been established between the remote end 104 and UE-1. In step 812, UE-1 initiates the transfer process by transmitting a SIP Re-INVITE message to the SCC AS 112 via the CSCF 110. The parameters of the Re-INVITE message identify the remote end 104 and provide transferee information for UE-2 and UE-3. The parameters further indicate that the local media flows are to be deleted and remote media flows are to be established.

The SCC AS 112 in turn initiates two INVITE procedures—one for each of UE-2 and UE-3, as illustrated in steps 814 and 816. Upon receiving the OK messages from UE-2 and UE-3, the SCC AS 112 transmits a SIP Re-INVITE message to the remote end 104 via the CSCF 110, including in the parameters the information for UE-2 and UE-3 as illustrated in step 818. Thereafter, remote media flows are established between the remote end 104 and each of UE-2 and UE-3, as indicated at step 820.

Figure 9:
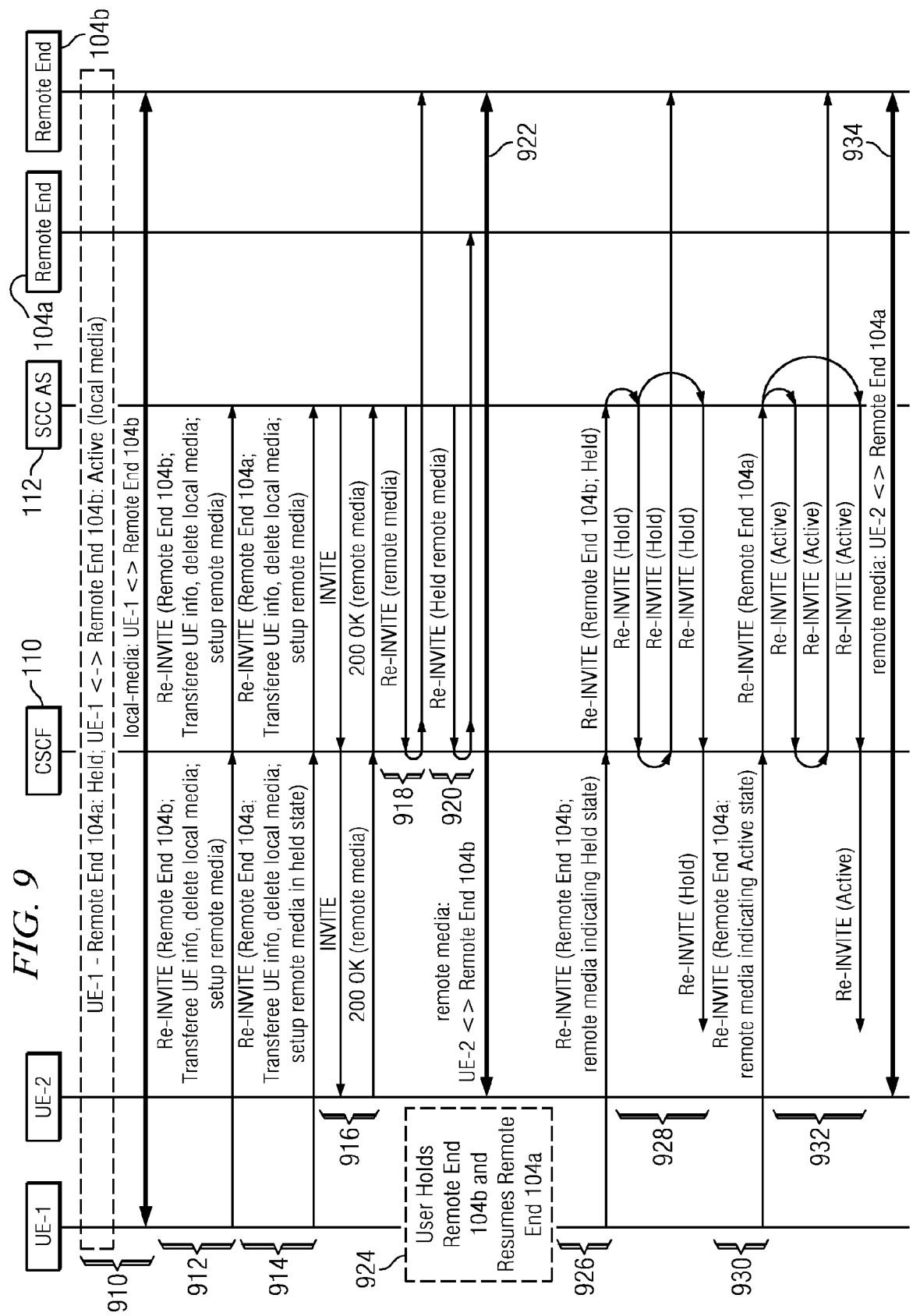
FIG. 9 is a message flow diagram for a transfer of a media flow from a controller device to a first remote device followed by a hold command in accordance with an embodiment of the present invention.

FIG. 9 is a message flow that may be used to transfer media from UE-1 to UE-2, followed by a media hold command, in accordance with an embodiment of the present invention. The process begins in step 910, wherein it is illustrated that two local media flows have been established between two remote ends, e.g., remote end 104a and remote end 104b. In this case, the local media flow with the remote end 104b is active while the local media flow with the remote end 104a is in the held state. Next, in step 912, UE-1 initiates a transfer of the local media flow with the remote end 104b from UE-1 to UE-2, and in step 914, UE-1 initiates a transfer of the local media flow with the remote end 104a from UE-1 to UE-2. It should be noted that the parameters used in the Re-INVITE message in step 914 include a parameter indicating that the remote media flow with the remote end 104a is in the held state.

The processes illustrated in steps 916-920 are similar to the corresponding steps discussed above to establish a remote media session, except in this situation, the SCC AS 112 transmits two Re-INVITE messages in steps 918 and 920—one for each of the remote ends 104a and 104b. Furthermore, the Re-INVITE message in step 920 sent to the remote end 104a has a parameter that indicates that the remote media flow is in the held state. Thus, as illustrated in step 922, an active remote media flow is established between the remote end 104b and UE-2. UE-1 remains the controller UE.

Step 924 indicates that the user, from the controller UE-1, issues a command to place the remote media flow between the remote end 104b and UE-2 on hold, and change the remote media flow between the remote end 104a and UE-2 from a hold state to an active state. As a result, UE-1 transmits a SIP Re-INVITE message having a parameter indicating that the remote media flow from the remote end 104b is to be placed on hold, as indicated in step 926. In step 928, the SCC AS 112 issues a SIP Re-INVITE message to the remote end 104b, instructing the remote end 104b to transition to the hold state. The SCC AS 112 also issues a SIP Re-INVITE message to UE-2 to instruct UE-2 to place the remote media flow from the remote end 104b into the hold state.

The controller UE-1 also issues a SIP Re-INVITE message to place the remote media flow from the remote end 104a into the active state from the hold state, as illustrated by step 930. The SCC AS 112 performs a process in step 932 similar to that discussed above with reference to step 928, except that the Re-INVITE message is used to transition the remote media flow between the remote end 104a and UE-2 from the held state to the active state, as illustrated in step 934.

Figure 10:
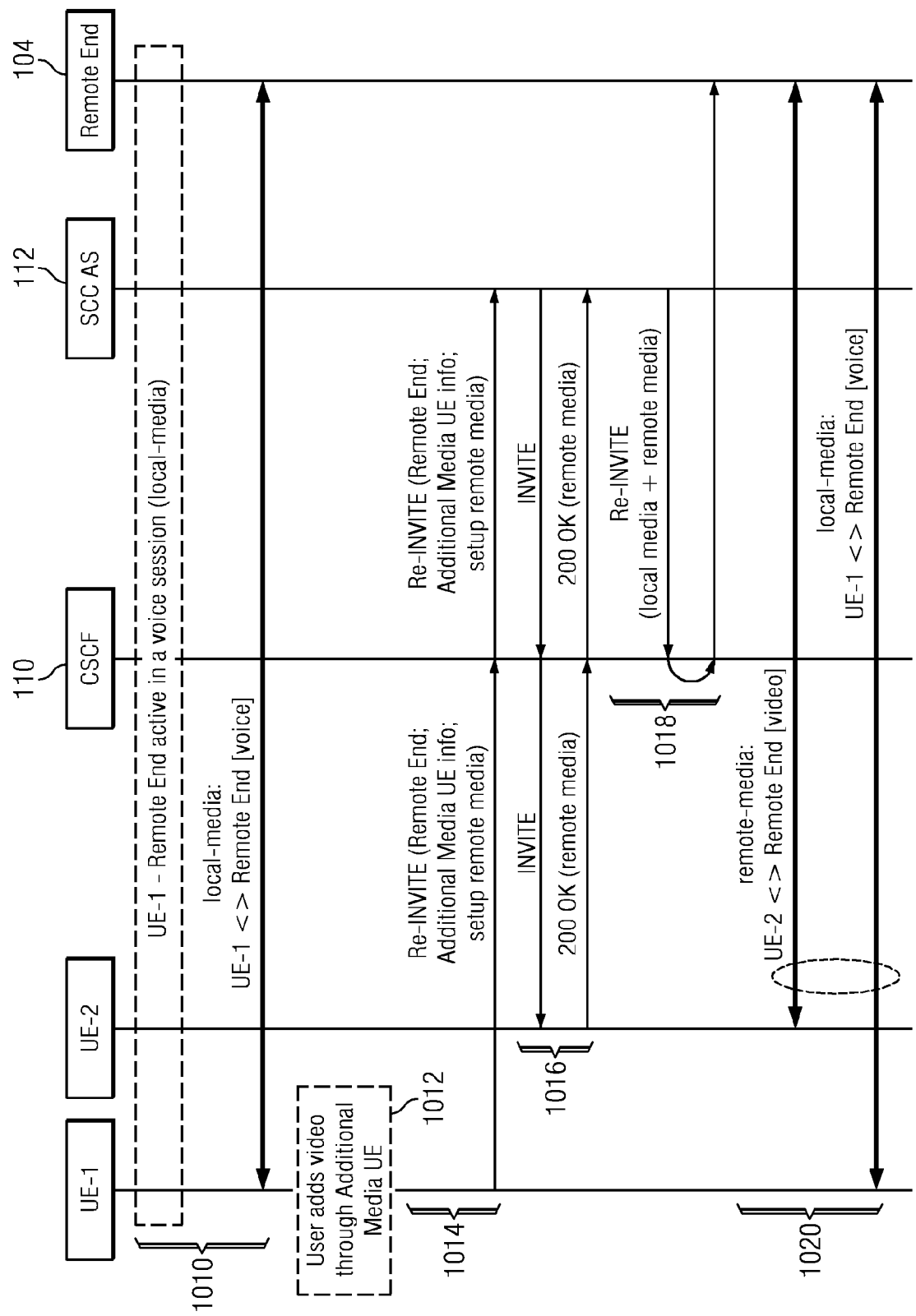
FIG. 10 is a message flow diagram for adding a media flow as part of a current session in accordance with an embodiment of the present invention.

FIG. 10 is a message flow that may be used to add a remote media flow as part of a current session in accordance with an embodiment of the present invention. The process begins in step 1010, wherein it is illustrated that a local media session has been established between the remote end 104 and the controller UE-1. Next, in step 1012, a user adds an additional media flow as a remote media session. An example of this situation is if a user was on a voice call, but wants to receive a video media flow associated with the voice call on a different device, e.g., UE-2. Steps 1014-1018 are similar to the steps 414-418 discussed above with reference to FIG. 4, except that the parameters used in the Re-INVITE messages in steps 1014-1018 indicate that a remote media flow is to be created without deleting the local media flow. As a result, a local media flow and a remote media flow will be established as illustrated in step 1020.

Figure 11:
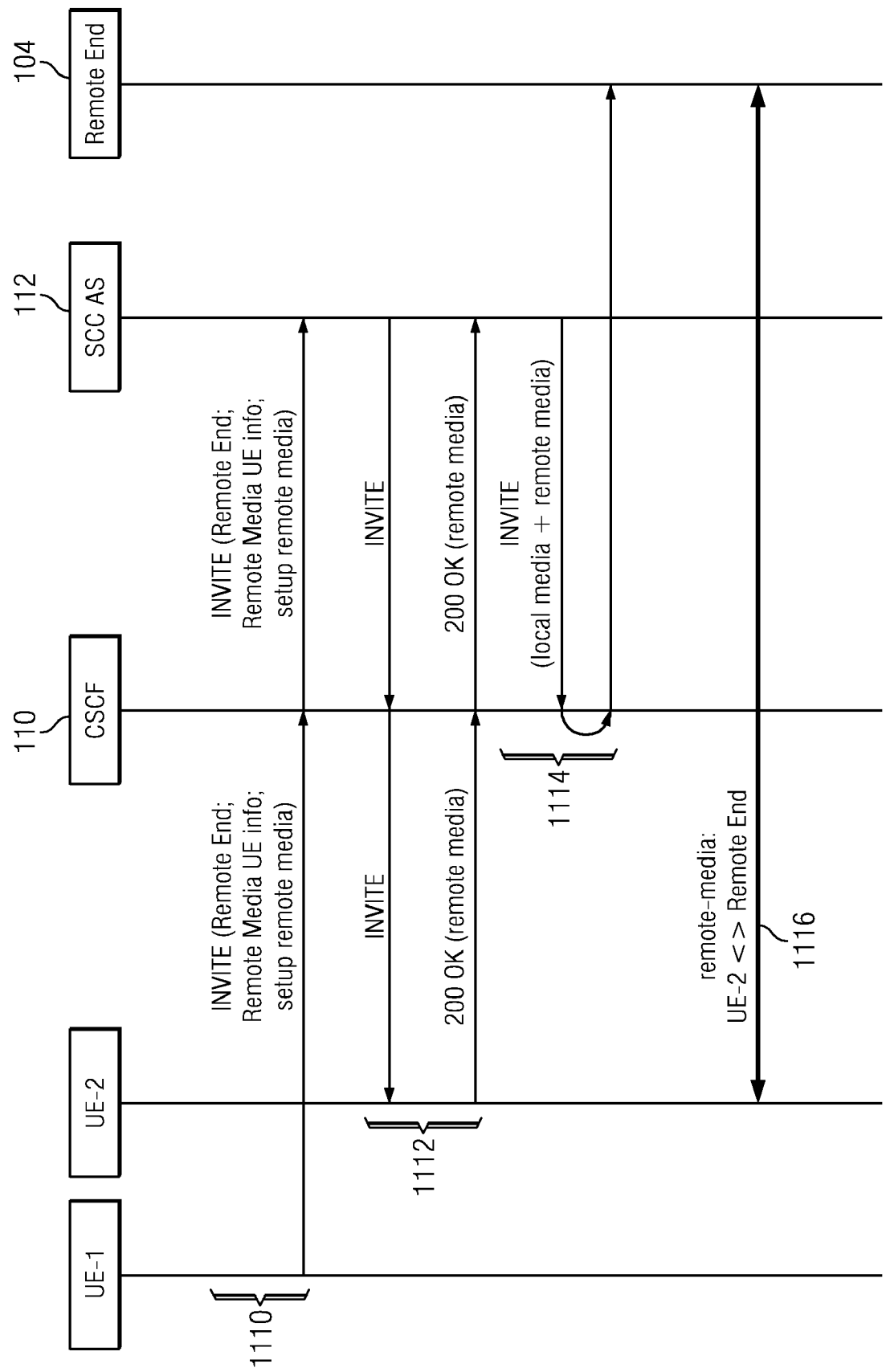
FIG. 11 is a message flow diagram for adding a media flow as part of a new session in accordance with an embodiment of the present invention.

FIG. 11 is a message flow that may be used to add a remote media flow as part of a new session in accordance with an embodiment of the present invention. The new session may be initiated by the user calling out (e.g., originating a call) or as part of the user answering a call (e.g., terminating a call). The process begins in step 1110, wherein UE-1 issues a SIP INVITE message to the SCC AS 112. Parameters to the INVITE message include information regarding the remote end 104, the remote media UE, e.g., UE-2, and an indication that a remote media session is to be established. In step 1112, the SCC ASS 112 transmits the INVITE to UE-2, which acknowledges with an OK message.

In step 1114, the SCC AS 112 transmits a SIP INVITE message to the remote end 104, including parameters indicating the local media and the remote media. Thereafter, a remote media flow is established between UE-2 and the remote end 104, wherein UE-1 maintains control as the controller UE, as illustrated in step 1116.

Figure 12:
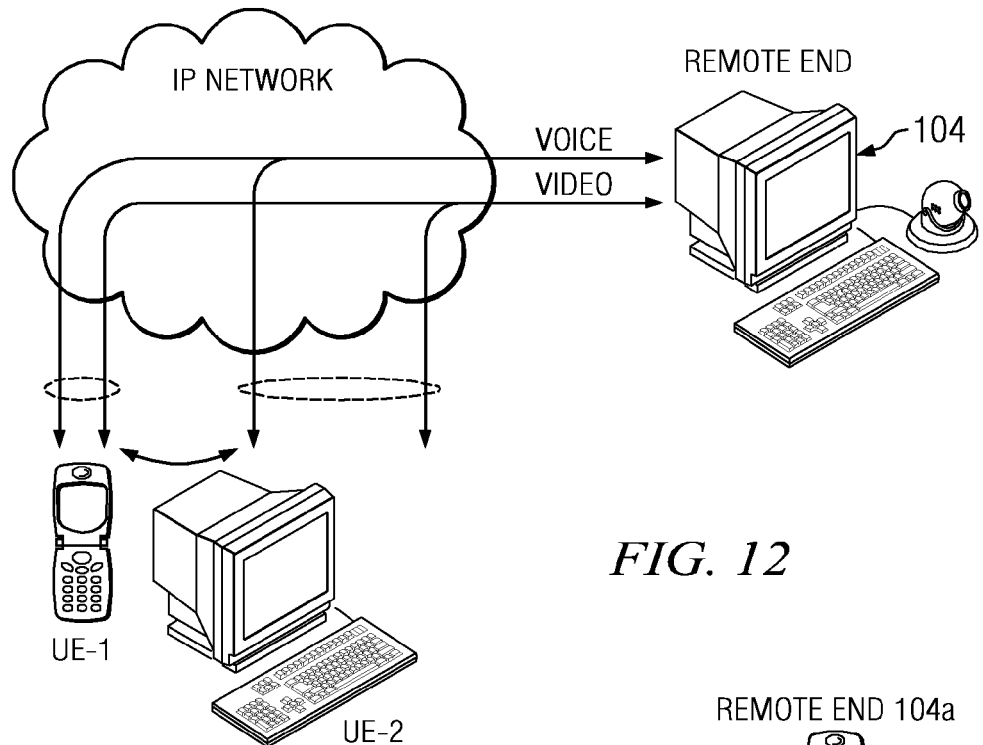
FIG. 12 depicts a user toggling a media flow between two devices in accordance with an embodiment of the present invention.
Figure 13:
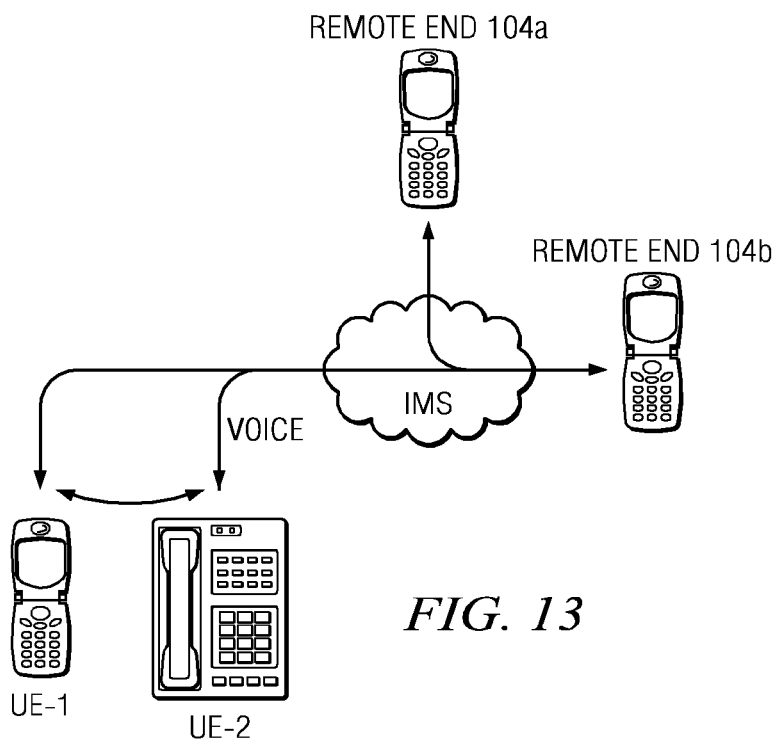
FIG. 13 depicts a user toggling a media flow of a multi-session between two devices in accordance with an embodiment of the present invention.

One of ordinary skill in the art will realize that the techniques discussed above allow a multitude of mobility options. For example, FIG. 12 illustrates a situation in which a user may toggle between a mobile device (UE-1) and a stationary device (UE-2) as he/she moves in and out of his/her office. With the remote session control described above, the user may move the control of a multi-media session with the media or keep the control in UE-1. Another example is illustrated in FIG. 13, wherein a user may toggle his/her voice conference, or any other multi-session, between two devices, such as his/her mobile (UE-1) and his/her PSTN phone (UE-2).

Figure 14:
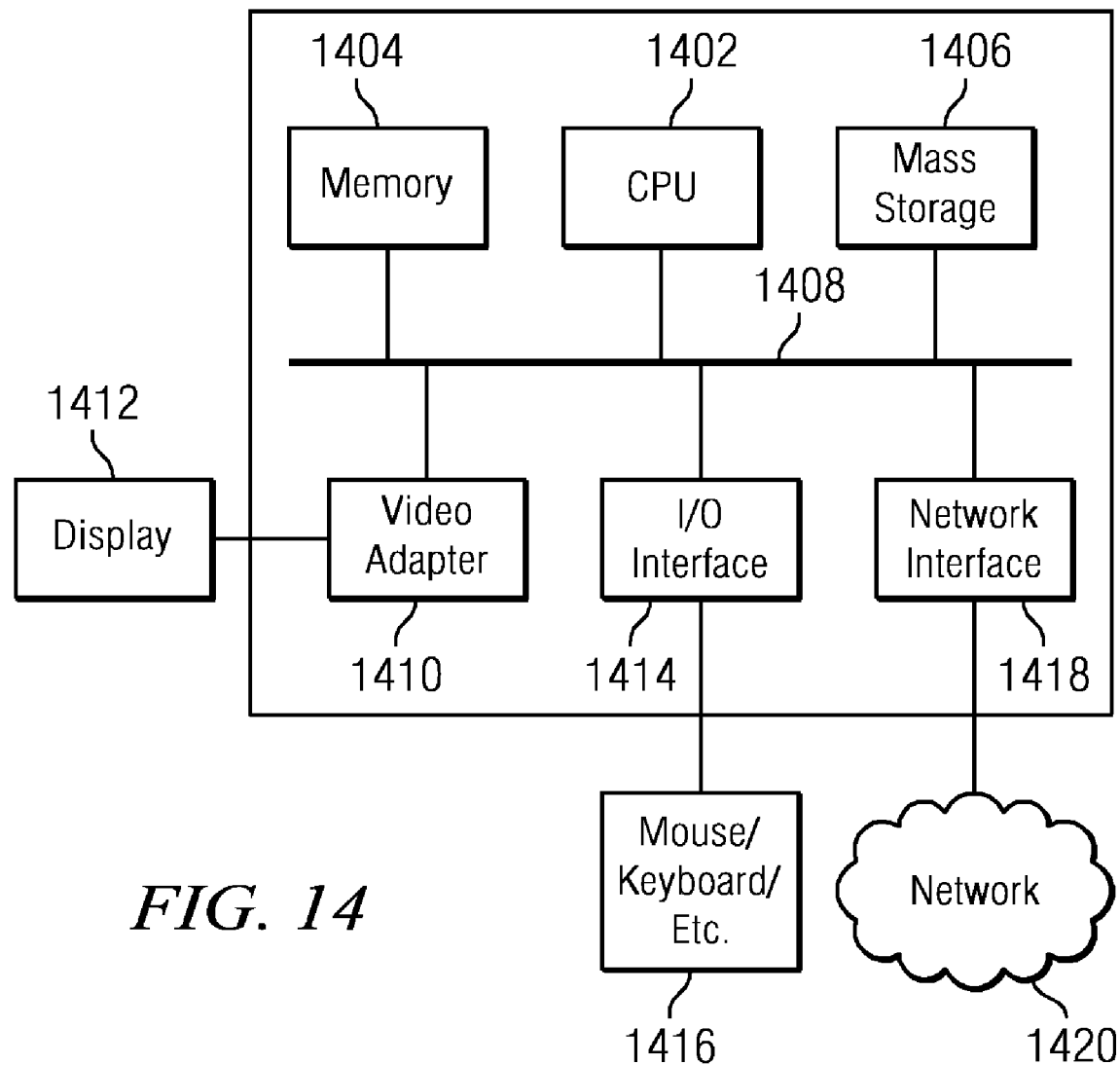
FIG. 14 is a block diagram of a network element in accordance with an embodiment of the present invention.

Referring now to FIG. 14, a block diagram of a network element 1400 is provided in accordance with an embodiment of the present invention. The network element 1400 depicts a general purpose platform and the general components and functionality that may be used to implement any or all of the UE, the SCC AS 112, or the CSCF 110. The network element 1400 may include, for example, a central processing unit (CPU) 1402, memory 1404, and a mass storage device 1406 connected to a bus 1408 configured to perform the processes discussed above. The network element 1400 may further include a video adapter 1410 to provide connectivity to a local display 1412 and an I/O interface unit 1414 to provide an input/output interface for one or more input/output devices 1416, such as a mouse, a keyboard, printer, tape drive, CD drive, or the like.

The processing unit 210 also includes a network interface 1418, which may be a wired link, such as an Ethernet cable or the like, and/or a wireless/cellular link. For example, the network interface 1418 may comprise an Ethernet connection if the network element 1400 acts as CSCF or SCC AS, or even some UE. Mobile UEs, on the other hand, the network work element 1400 may comprise a suitable receiver and transmitter for wireless communications. It should be noted that the network element 1400 may include other components. For example, the network element 1400 may include power supplies, cables, a motherboard, removable storage media, cases, and the like. These other components, although not shown, are considered part of the network element 1400.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. As another example, it will be readily understood by those skilled in the art that different network elements, messaging, protocols, and/or the like may be varied while remaining within the scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for establishing a remote media session, the method comprising:
   causing a first communications session with a first device to be established, the first communications session comprising a first local media and a first session control path; and
   separating the first local media from the first session control path of the first communications session by,
      transferring the first local media on the first device to a first remote media on a second device, the first session control path remaining on the first device, wherein the first device is a different device than the second device; and
   thereafter, controlling the first local media of the first communications session using the first session control path on the first device.

2. The method of claim 1, further comprising combining a first remote signaling path of the first remote media and the first session control path to form a remote leg.

3. The method of claim 1, further comprising transferring the first remote media from the second device to a third device.

4. The method of claim 1, wherein the first communications session includes a second local media, the second local media remaining on the first device.

5. The method of claim 1, wherein the first communications session includes a second local media, and further comprising transferring the second local media to second remote media on a third device.

6. The method of claim 5, wherein the second device is a different device than the third device.

7. The method of claim 1, further comprising transferring the first remote media back to the first device.

8. The method of claim 1, further comprising:
   establishing a second communications session with the first device, the second communications session comprising a second local media and second session control path; and
   separating the second local media from the second session control path of the second communications session by,
   transferring the second local media on the first device to a second remote media on a third device, the second session control path remaining on the first device, wherein the first device is a different device than the third device; and
   thereafter, controlling the second local media of the second communications session using the second session control path on the first device.

9. The method of claim 8, further comprising placing one of the first remote media and the second remote media in a hold state.

* * * * *